United States Patent [19]

Contato

[11] 4,399,888
[45] Aug. 23, 1983

[54] SUPPORT GROUP FOR MOUNTING INSTRUMENT AND ELECTRICAL COMPONENTS IN A MOTOR VEHICLE

[75] Inventor: Ugo Contato, Turin, Italy

[73] Assignee: Fiat Auto S.p.A., Turin, Italy

[21] Appl. No.: 251,110

[22] Filed: Apr. 6, 1981

[30] Foreign Application Priority Data

Apr. 8, 1980 [IT] Italy ................... 67545 A/80

[51] Int. Cl.³ .................. B60K 35/00; B60R 16/02
[52] U.S. Cl. .................................... 180/315; 180/78; 180/90; 307/10 R
[58] Field of Search ........ 180/315, 316, 318, 320–326, 180/333, 334, 78, 90; 123/185 NP; 307/9, 10 R, 10 LS; 74/484 R

[56] References Cited

U.S. PATENT DOCUMENTS 3,857,454 12/1974 Kobayashi et al. ................. 180/78
4,352,401 10/1982 Vitaloni ............................... 180/90

FOREIGN PATENT DOCUMENTS 3113509 1/1982 Fed. Rep. of Germany ...... 180/315
3113510 2/1982 Fed. Rep. of Germany ...... 180/315
2262474 9/1975 France ................................. 180/333
2039346 8/1980 United Kingdom ................ 180/78

Primary Examiner—David M. Mitchell
Assistant Examiner—Mitchell J. Hill
Attorney, Agent, or Firm—Frost & Jacobs

[57] ABSTRACT

A motor vehicle support group for mounting an instrument and control device carrier assembly, accessory elements, and an electric interconnection group for the instruments, control devices and accessory elements, in the passenger compartment of the motor vehicle, the support group comprising a first support part and a second support part adapted to be adjustably secured together, the first support part being mounted on the steering column of the motor vehicle and the second support part being mounted on the dashboard of the vehicle, the support parts and the components mounted thereon being adapted to be preassembled so that the assembly may be tested prior to installation in the motor vehicle.

11 Claims, 2 Drawing Figures

SUPPORT GROUP FOR MOUNTING INSTRUMENT AND ELECTRICAL COMPONENTS IN A MOTOR VEHICLE

BACKGROUND OF THE INVENTION

The present invention relates to a support group for mounting an instrument and/or control device carrier assembly and/or an electric interconnection group for the control devices and/or instruments of a vehicle, in particular a motor vehicle.

As is well-known, at present time the instrument carrier assembly, the various electric control devices, the electric interconnection group for the various instruments, control devices and accessory elements (which interconnection group comprises a printed circuit board carrying the various fuse carriers), the ignition switch, the steering lock device, etc., are mounted separately on the vehicle as it is assembled on the assembly line. This gives rise to various disadvantages, such as the relatively long time required to assemble the components on the assembly line, and the impossibility to carry out preliminary testing of the components, etc.

SUMMARY OF THE INVENTION

It is an object of the present invention to provide a single support group for at least the instrument carrier assembly and/or the electric interconnection group, which support group is of simple and economical structure and permits rapid assembling on the motor vehicle, so as to avoid the disadvantages mentioned hereinabove.

Other objects and advantages of the present invention will be apparent from the following description.

According to the present invention there is provided a support group for mounting the instrument and/or control device carrier assembly of a vehicle and/or an electric interconnection group for the control devices and/or instruments and/or accessory elements of the said vehicle, characterized in that it comprises one or more support parts attached to one another for mounting the said assembly and/or the said electric interconnection group and for assembling them on the steering column of the said vehicle.

BRIEF DESCRIPTION OF THE DRAWINGS

For a better understanding of the present invention two embodiments thereof will now be described in detail, by way of non limiting examples, with reference to the accompanying drawings in which.

DETAILED DESCRIPTION OF THE INVENTION

Figure 1:
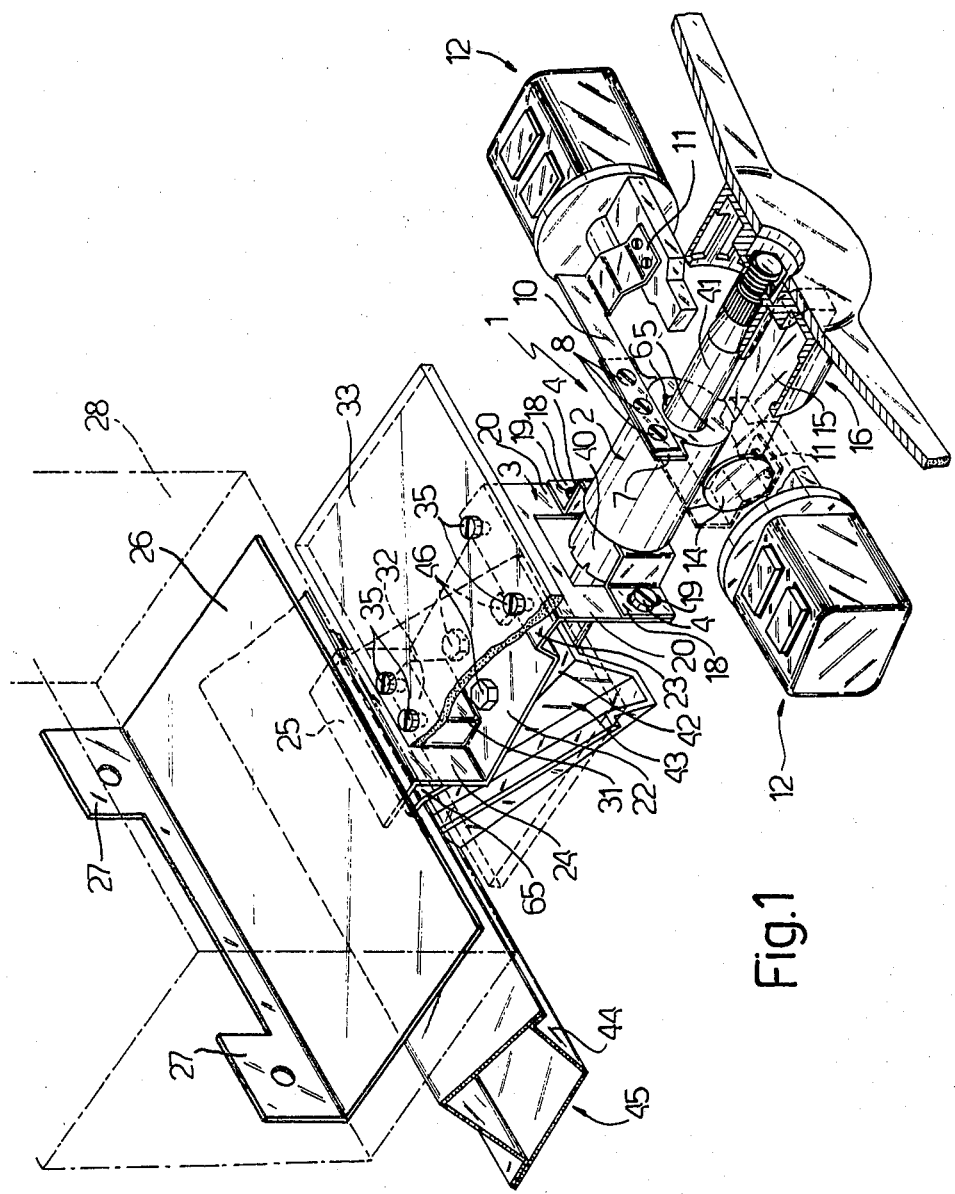
FIG. 1 is a perspective view with parts in section of a support group in accordance with the present invention mounted on a vehicle.

Referring now to FIG. 1, referance numeral 1 indicates the said support group according to the present invention, comprising two main support parts 2 and 3 which are attached to one another by means of screws 4 in a way which will described later.

Support part 2 comprises a substantially cylindrical tube provided at its front end with an annular rim 5 having an axial bore 6. Extending upwardly from the front end of part 2 is a substantially rectangular projection 7 to which there is fixed, by means of screws 8, a support arm 10 (partially shown by dashed lines) which is provided at its ends with two support projections 11 to which there are fixed, respectively, two electric control blocks 12 for mounting positions for various elements, such as direction indicators, lights, emergency signalling device, thermal rear window, etc.

Projecting from the lower region of the cylindrical support part 2 is a hollow cylindrical part 14 whose axis is orthogonal to the support part 2 and in which there may be accomodated an ignition key switch of known type (not shown) and a steering lock device (of known type) which controls the engagement and disengagement of a latch 15 with a steering wheel hub 16.

Projecting from the rear end of the cylindrical support part 2 are two side projections 18 which are bent orthogonally toward the outside and in the ends of which there are formed two longitudinal slots 19 in which there are accomodated, with a possibility of adjustment, the two screws 4 which serve to fix to the two projections 18 to the respective vertical projections 20 of the support part 3.

Support part 2 is made in one piece, conveniently by pressure die-casting, and comprises the cylindrical central part, the front base 5, the projections 7 and 18 and the lower cylindrical part 14.

Support part 3, instead of being die cast, is conveniently made of a shaped sheet plate having a substantially rectangular planar central portion 22 which is bent upwardly at its front end so as to define a horizontal portion 23 at a level higher than the central portion 22, and from the front end of which two projections 20 extend downwardly. At its rear end the central portion 22 is bent upwards, thus forming a wall 24 which and a rearwardly projecting vertical part 25 to there is fixed, for example by welding, the front region of a support part 26, made of plate, which at its rear edge is bent upwards and is provided with two projections 27 for the attachment, by known means (not shown), of an instrument and control device carrier assembly (shown by a chain line).

Originating from the rear region of the plane central portion 22 and the wall 24 are a vertical wall 31 and a plane wall 32, and this latter, in combination with the plane portion 23, defines a bearing horizontal for a board 33 of an electric interconnection group for the control devices, instruments and accessory elements of the vehicle. The said board 33, which is fixed to the wall 32 and to the portion 23 by means of screws 35, carries (in a known manner not shown) a printed circuit, a plurality of fuse carrier elements with their respective fuses, and a plurality of connectors for the electric connection of the various control devices, instruments and accessory elements, in particular the instrument and control device carrier assembly 28, to the electric control blocks 12 and to the ignition switch housed within on part 14.

The assembling of the support group 1 constructed according to the present invention is carried out as follows.

To the support part 2 are connected by means of screws 8 the arms 19 which carry the electric control blocks 12, and in the cylindrical part 14 there is accomodated the ignition switch with the steering lock device, while to the support part 3 are connected the instrument and control device carrier assembly 28 (by means of the support part 26) and the board 33 (by means of the screws 35). The two support parts 2 and 3 are then connected to one another by means of the screws 4, and to the board 33 are connected the various electric connectors (not shown). In this way, the said support group comprising the parts 2 and 3 and the instrument and control device assembly 28, board 33, electric control blocks 12 and the ignition switch, may be easily subjected to prelimnary testing before being mounted in the vehicle.

For the actual mounting of the support group in the vehicle, cylindrical support part 2 is fitted around a tube 40 forming a part of a steering column 41 of the vehicle, until the front end of the said tube 40 comes to rest on the inner surface of the annular rim 5 of the part 2. The steering column 41 projects outwardly from the axial bore 6 and on its front end is mounted, in a known manner, the steering wheel hub 16. The position of the support part 3 is then adjusted relative to the part 2 by means of the screws 4 which are housed in the slots 19, in such a manner that the central planar portion 22 of the support part 3 will rest on a central portion 42 of a body bracket 43, which has two shaped side portions of U-shaped cross-section (one of which is shown in FIG. 1) and is fixed in its rear region to a transversely disposed wall 44 of a body crosspiece 45 corresponding to the dashboard of the vehicle. Connected to the central portion 42 of the body bracket 43 is a wall 65 whose end is fixed in the upper region of the body crosspiece 45. The said central planar portion 22 of the support prt 3 is then secured the central portion 42 of the body bracket 43 by means of three bolts 46.

Figure 2:
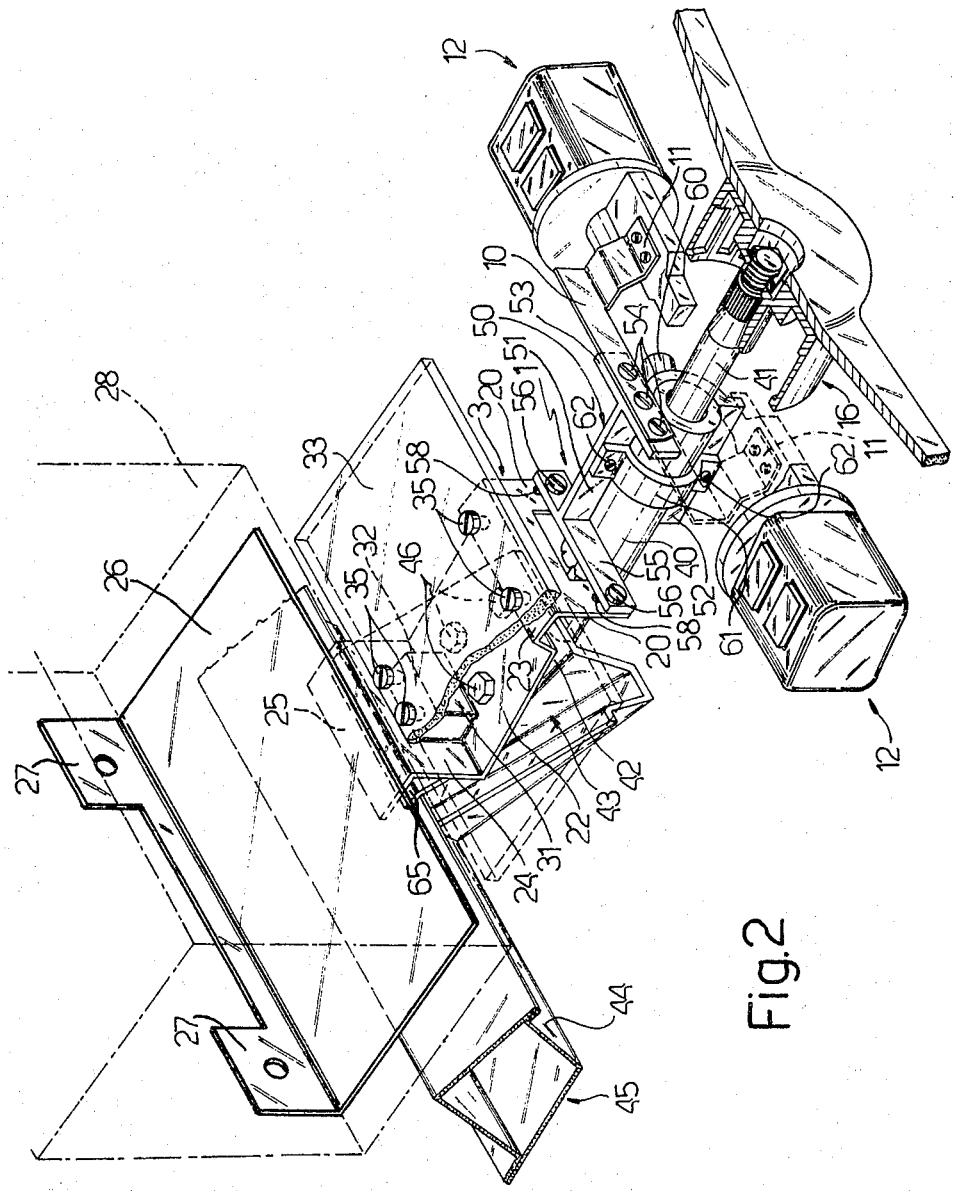
FIG. 2 is a perspective view with parts in section of a different embodiment of the support group in accordance with the teachings of the present invention.

The support group shown in FIG. 2 differs from that shown in FIG. 1 by a different embodiment of the support part 2 which is indicated in FIG. 2 by reference numeral 50. Instead of having a cylindrical central portion, the central portion is semicylindrical in shape, and has two longitudinal walls 51 and 52 which are substantially rectangular in shape and project outwardly in opposite directions. Extending perpendicularly from the front end of the wall 51 is a substantially rectangular projection 53, to which there is fixed, by means of screws 54, the support arm 10 supporting the electric control blocks 12, while from the rear end of the wall 51 there extends perpendicularly a projection 55, substantially rectangular in shape, to which there are fixed, by means of screws 56, the vertical projections 20 of the support part 3. In this embodiment, for the adjustment of the position of the support part 3 relative to the support part 2, instead of the longitudinal slots 19 on the projections 18 of the support part 2 there are provided longitudinal slots 58 on the projections 20 of the support part 3.

The support part 50 is made by pressure die-casting and comprises, integrally therewith, the walls 51 and 52, the projections 53 and 55. The casting also may include an integral cylindrical portion 60 which is disposed perpendicularly to the axis of the support part 50 and accomodates a key type ignition switch and the steering lock device (which are known), which steering lock device acts onto the steering column, instead of acting onto the steering wheel hub, as shown in FIG. 1.

The assembly of the support part 50 onto the tube 40 of the steering column 41 is carried out by means of a semicircular bracket 61 which has the same diameter as the tube 40 and the support part 50 and whose ends are fixed, by means of screws 62, to the longitudinal walls 51 and 52.

The adjustment of the position of support part 50 and its fixing attachment to the body bracket 43 are carried out previously described with reference to FIG. 1.

With the support group according to the present invention there is thus obtained the advantage of having an assembly of various components supported on each of the parts 2 and 3 and with the possibility of adjustment of the relative positions of the two parts. The components are easily assembled both on the various support parts and on the steering column of the vehicle. The said common support group for these various components facilitates their preliminary testing before their assembly in the vehicle, inasmuch as the support group forms an assembly including the various electric connection elements. In addition, the manufacture of the said support group is relatively simple and therefore economical.

Finally, it is clear that many modifications and variations may be made to the described embodiments of the present invention, without departing from the scope of the invention itself.

For example, the support parts 2 and 3 may have different shapes; the electric interconnection board 33 may be of a different type; etc.

I claim:

1. A motor vehicle support group for mounting an instrument and control device carrier assembly, accessory elements, and an electric interconnection group for the control devices, instruments and accessory elements, in the passenger compartment of the motor vehicle, said support group comprising at least two support parts, means adjustably interconnecting the two support parts, a first of said two parts being adapted to be mounted on the steering column of the motor vehicle, and the second of said two parts being adapted to be secured to a body part of the dashboard of the motor vehicle.

2. A motor vehicle support group as claimed in clam 1, including an electric interconnection group comprising a board for a printed circuit, mounted on said second part.

3. A motor vehicle support group as claimed in claim 2 wherein said second part is formed from a stamped plate, said plate being configured to mount said electric interconnection group.

4. A motor vehicle support group as claimed in claim 1 wherein said first support part is configured to provide an attachment member for engaging the steering column of the motor vehicle.

5. The motor vehicle support group as claimed in claim 4 wherein said attachment member comprises a cylindrical tube adapted to be fitted around the steering column of the motor vehicle.

6. The motor vehicle support group claimed in claim 4 wherein said attachment member is of semicylindrical configuration and is adapted to be clamped to the steering column of the motor vehicle, and a clamp member for clamping the semicylindrical attachment member to the steering column of the motor vehicle.

7. The motor vehicle support group as claimed in claim 5 or 6 wherein the means adjustably interconnecting said first and second support parts comprises first connection projections mounted on one end of said attachment member, and wherein said attachment member is provided at its opposite end with second connection projections for supporting control devices for the motor vehicle.

8. A motor vehicle support group as claimed in claim 7 characterized in that the said first support part is die cast and is configured to mount an ignition switch for the motor vehicle and a steering wheel locking device.

9. A motor vehicle support group as claimed in claim 1 wherein the means adjustably interconnecting the two support parts comprises a first set of connection projections on said first support part and a set of mating projections on said second support part, said sets of connection projections being adapted to be secured together by screws, one of said sets of projections having elongated slots therein for receiving the screws, whereby the support parts may be adjusted relative to each other.

10. The motor vehicle support group as claimed in claim 1 including an instrument and control device carrier assembly and an electrical interconnection group mounted on said second part, and accessory elements mounted on said first part.

11. The motor vehicle support group as claimed in claim 10 wherein said second support part is mounted on a body bracket affixed to the dashboard of the motor vehicle.

* * * * *